(12) United States Patent
Yli-Alho et al.

(10) Patent No.: US 12,350,663 B2
(45) Date of Patent: Jul. 8, 2025

(54) ANALYSER, AN ANALYSER BODY AND A SENSOR PART

(71) Applicant: AEROMON OY, Helsinki (FI)

(72) Inventors: Jani Yli-Alho, Helsinki (FI); Jussi Tikkanen, Helsinki (FI); Matti Irjala, Helsinki (FI)

(73) Assignee: AEROMON OY, Helsinki (FI)

( * ) Notice: Subject to any disclaimer, the term of this patent is extended or adjusted under 35 U.S.C. 154(b) by 864 days.

(21) Appl. No.: 17/253,777

(22) PCT Filed: Jun. 19, 2019

(86) PCT No.: PCT/FI2019/050472
§ 371 (c)(1),
(2) Date: Dec. 18, 2020

(87) PCT Pub. No.: WO2019/243668
PCT Pub. Date: Dec. 26, 2019

(65) Prior Publication Data
US 2021/0268501 A1    Sep. 2, 2021

(30) Foreign Application Priority Data
Jun. 20, 2018 (FI) .................................. 20185559

(51) Int. Cl.
*B01L 3/00* (2006.01)
*G01D 11/24* (2006.01)
*G01D 11/30* (2006.01)

(52) U.S. Cl.
CPC ........ *B01L 3/502715* (2013.01); *G01D 11/24* (2013.01); *G01D 11/30* (2013.01); *B01L 2200/026* (2013.01); *B01L 2300/0627* (2013.01)

(58) Field of Classification Search
CPC ........ B01L 3/502715; B01L 2200/026; B01L 2300/0627; G01D 11/24; G01D 11/30
(Continued)

(56) References Cited

U.S. PATENT DOCUMENTS

| 3,187,582 A | 6/1965 | Caldwell et al. |
| 6,615,669 B1 * | 9/2003 | Nishimura .......... G01L 19/0038 |
| | | 73/756 |

(Continued)

FOREIGN PATENT DOCUMENTS

| CN | 1654792 A | 8/2005 |
| CN | 103182127 A | 7/2013 |

(Continued)

OTHER PUBLICATIONS

Finnish Search Report issued by the Finnish Patent and Registration Office in relation to Finnish Application No. 20185559 dated Nov. 26, 2018 (2 pages).

(Continued)

*Primary Examiner* — Marrit Eyassu
(74) *Attorney, Agent, or Firm* — Robert P. Michal, Esq.; Carter, DeLuca & Farrell LLP

(57) ABSTRACT

An analyser includes an analyser body, a sensor part and a connection between the sensor part and the analyser body. The connection includes a fluid connection and a mechanical connection including a first connecting surface having a first perimeter structure and a second perimeter structure within the first perimeter structure; and a second connecting surface having a third perimeter structure and a fourth perimeter structure within the third perimeter structure. The first perimeter structure forms a first mechanical connection with the third perimeter structure and the second perimeter structure forms a second mechanical connection with the fourth (Continued)

perimeter structure. The fluid connection is provided within the second mechanical connection.

14 Claims, 13 Drawing Sheets

(58) Field of Classification Search
USPC ........................................................ 73/866.5
See application file for complete search history.

(56) References Cited

U.S. PATENT DOCUMENTS

| | | | |
|---|---|---|---|
| 10,620,070 B2* | 4/2020 | Gadini | G01L 19/143 |
| 2006/0163125 A1* | 7/2006 | Olivier | G01N 1/4005 |
| | | | 210/97 |
| 2009/0272205 A1* | 11/2009 | Brown | G01L 19/0015 |
| | | | 73/866.5 |
| 2010/0075425 A1 | 3/2010 | Hofmann et al. | |
| 2010/0113897 A1 | 5/2010 | Brenneman et al. | |
| 2011/0174080 A1* | 7/2011 | Zorzetto | G01L 9/0051 |
| | | | 73/756 |
| 2011/0309841 A1 | 12/2011 | Oberndorfer et al. | |
| 2012/0247179 A1 | 10/2012 | Kerin et al. | |
| 2013/0217598 A1 | 8/2013 | Ludwig et al. | |
| 2016/0084716 A1* | 3/2016 | Sun | G01K 1/14 |
| | | | 374/208 |
| 2017/0188912 A1* | 7/2017 | Halac | A61B 5/6849 |
| 2017/0248449 A1* | 8/2017 | Kareco | G01L 19/147 |
| 2018/0058887 A1 | 3/2018 | Gindele et al. | |
| 2018/0187811 A1* | 7/2018 | Scholz | F16L 37/20 |
| 2019/0003913 A1* | 1/2019 | Hanley | G01L 19/142 |
| 2019/0336054 A1* | 11/2019 | Shah | A61B 5/0002 |

FOREIGN PATENT DOCUMENTS

| | | | |
|---|---|---|---|
| CN | 207300485 U | 5/2018 | |
| CN | 108918030 A * | 11/2018 | |
| EP | 0994339 A1 | 4/2000 | |
| EP | 2934754 B1 * | 8/2017 | G01D 11/30 |
| GB | 2536975 A | 10/2016 | |
| PL | 221385 B1 * | 4/2016 | |
| WO | WO-2017001504 A1 * | 1/2017 | A61M 39/02 |

OTHER PUBLICATIONS

International Search Report issued by the Finnish Patent and Registration Office acting as the International Searching Authority in relation to International Application No. PCT/FI2019/050472 dated Oct. 9, 2019 (6 pages).

Written Opinion of the International Searching Authority issued by the Finnish Patent and Registration Office acting as the International Searching Authority in relation to International Application No. PCT/FI2019/050472 dated Oct. 9, 2019 (8 pages).

* cited by examiner

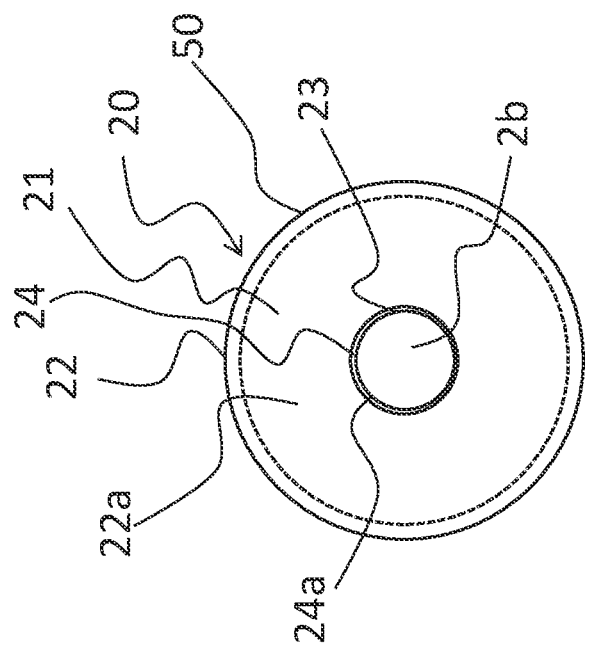
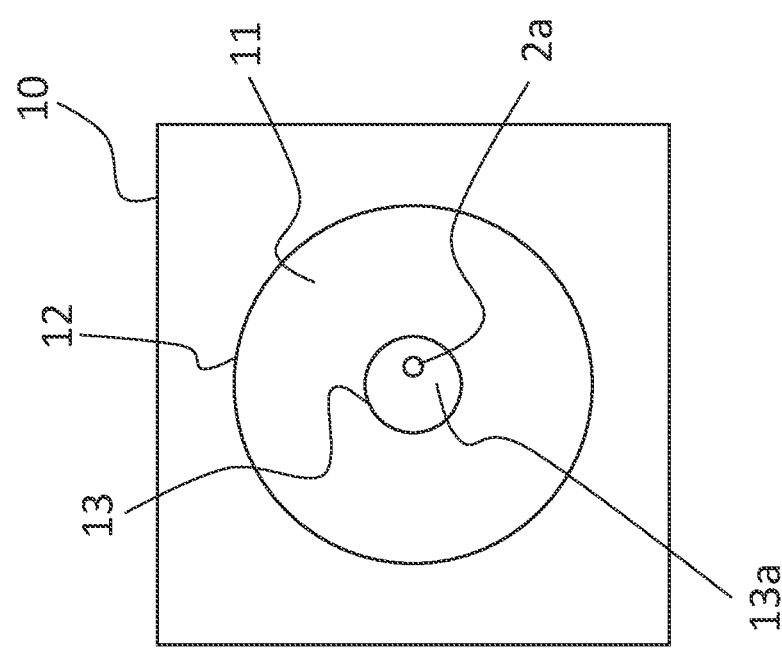
Fig. 4a
Fig. 4b

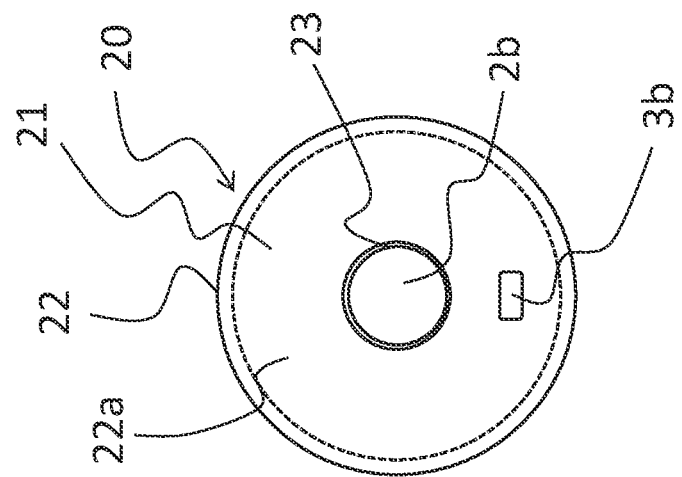
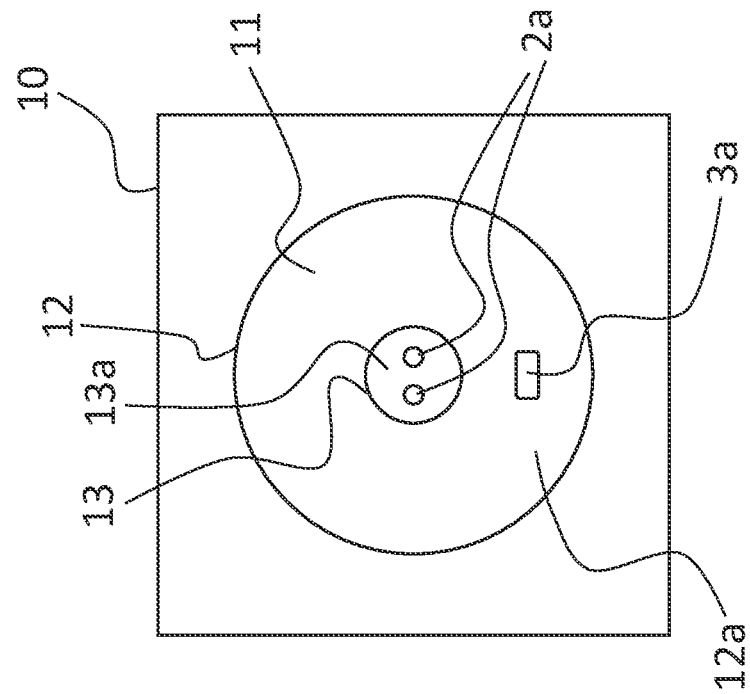
Fig. 5a
Fig. 5b

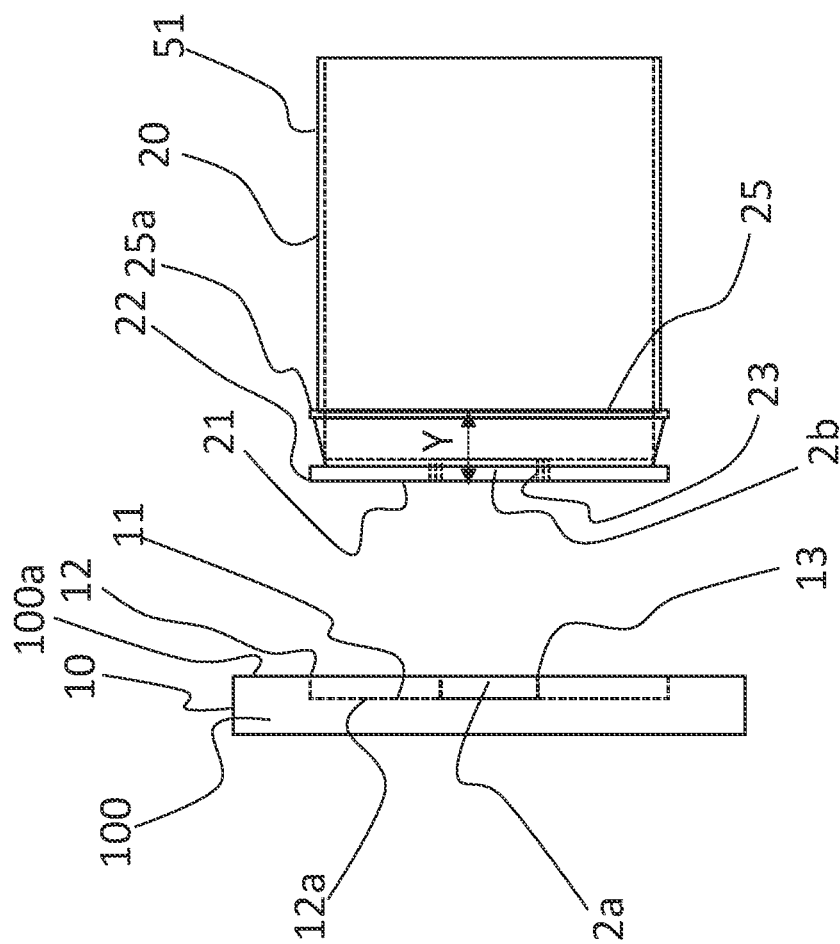

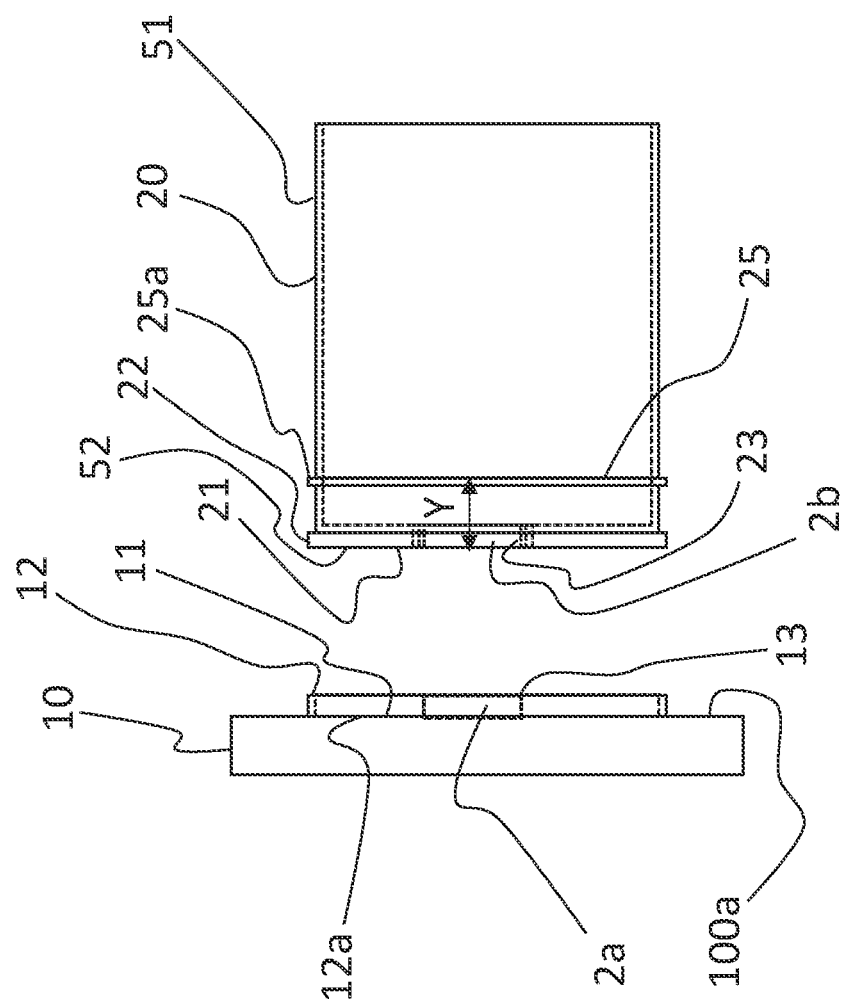

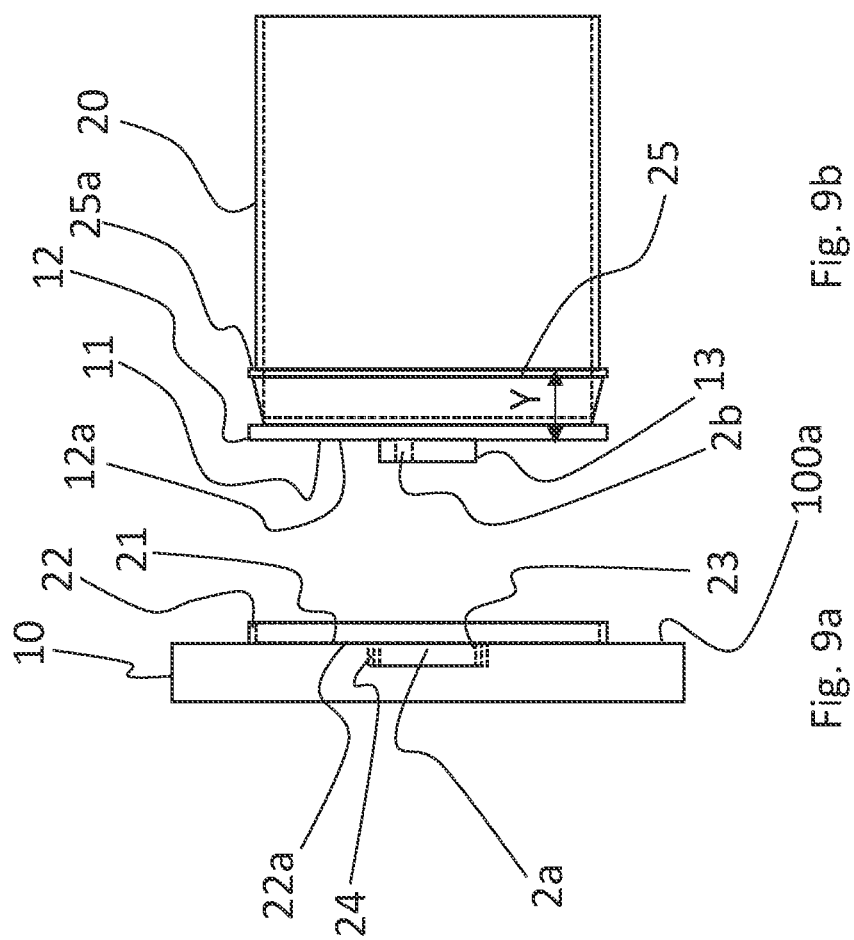

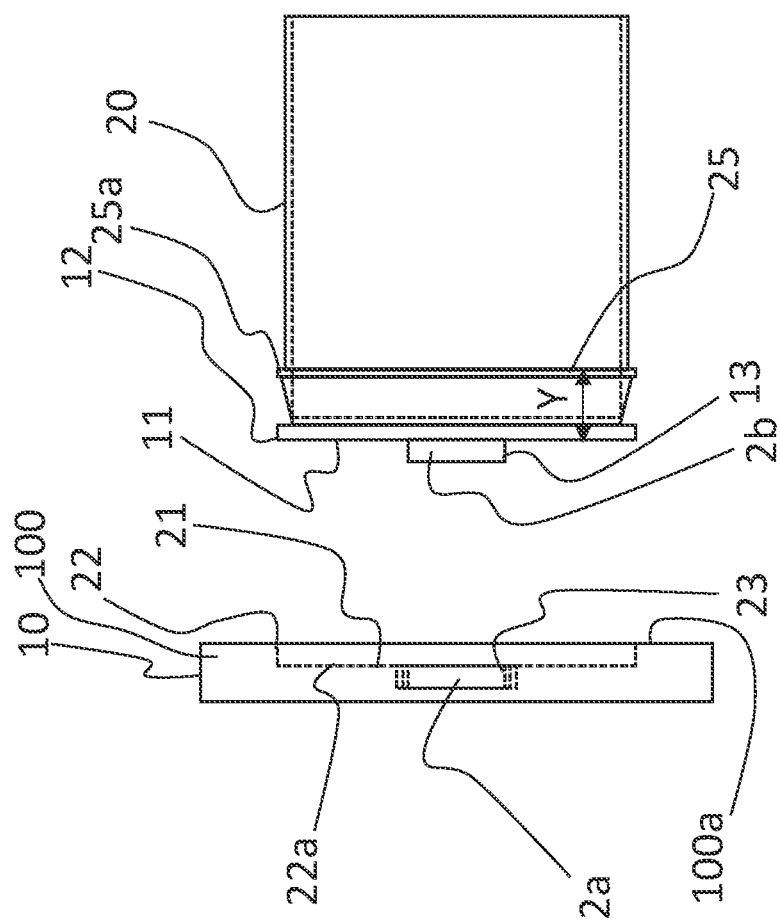

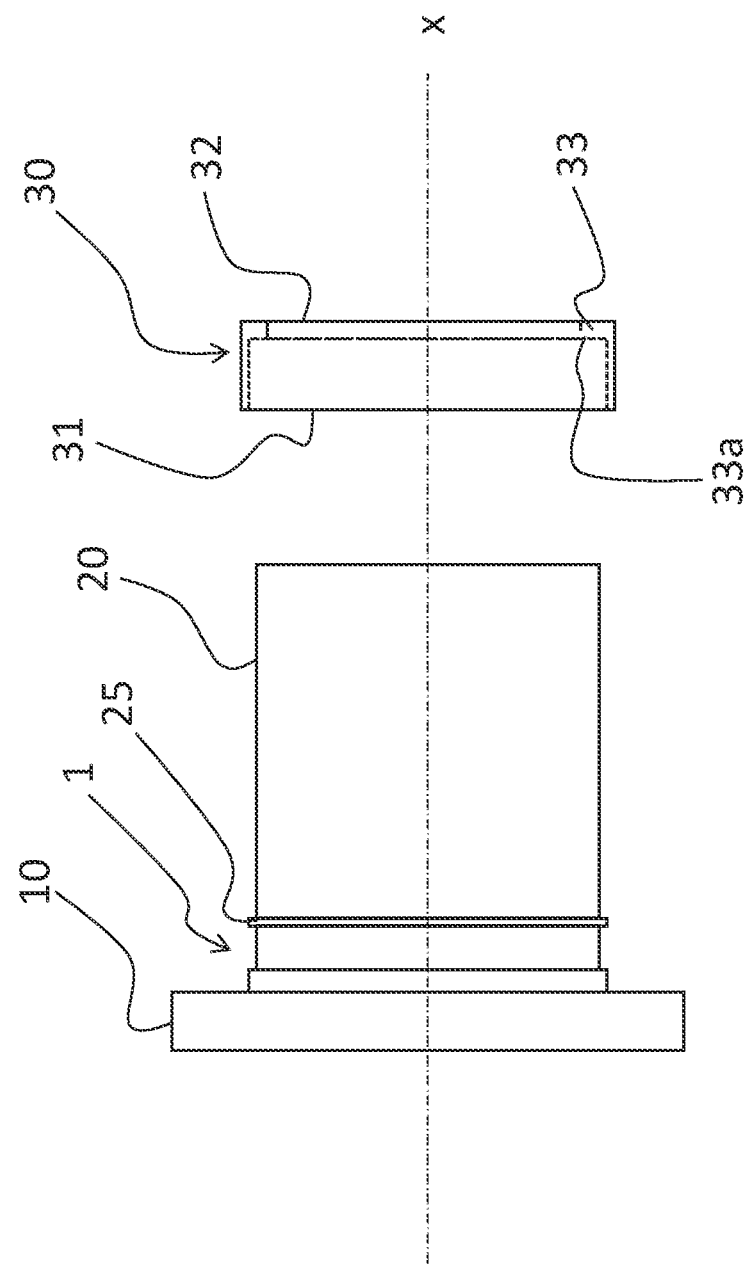

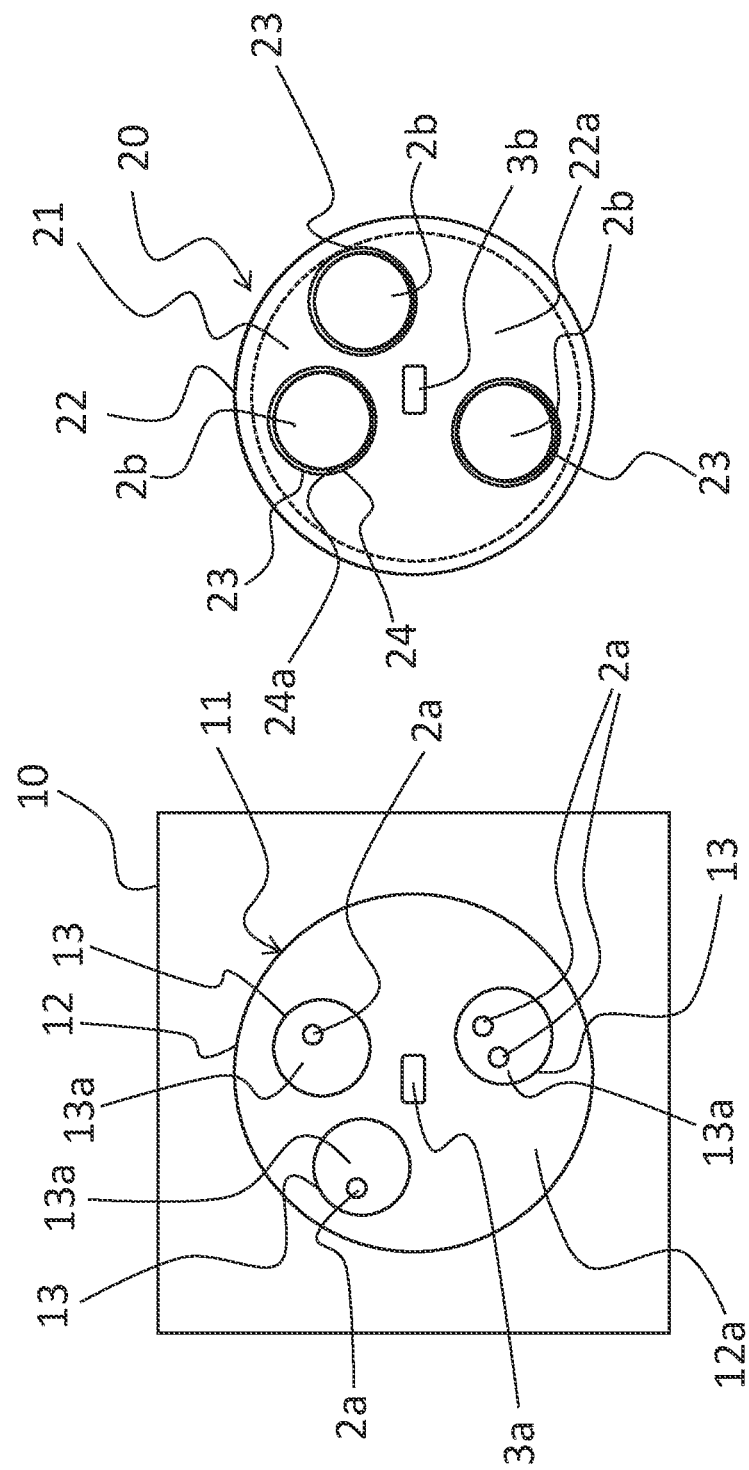

ANALYSER, AN ANALYSER BODY AND A SENSOR PART

CROSS-REFERENCE TO RELATED APPLICATIONS

This application is a national phase entry under 35 U.S.C. 371 of PCT International Application No. PCT/FI2019/050472 filed Jun. 19, 2019, which claims priority to Finnish Patent Application No. 20185559, filed Jun. 20, 2018, the disclosure of each of these applications is expressly incorporated herein by reference in their entirety.

FIELD OF THE INVENTION

The present invention relates to an analyser.
The present invention relates also to an analyser body.
The present invention relates also to a sensor part.

BACKGROUND OF THE INVENTION

In prior art analysers, the sensors are provided within the analyser body such that the analyser body protects the sensors from external interferences.

One of the problems associated with the prior art analysers is that the sensors are not easily replaced when it is desired to analyse different properties from fluids.

BRIEF DESCRIPTION OF THE INVENTION

An object of the present invention is to solve or at least to alleviate the prior art disadvantages.

The objects of the invention are achieved by an analyser, an analyser body and a sensor part which are characterized by what is stated in the independent claims. The preferred embodiments of the invention are disclosed in the dependent claims.

The invention is based on the idea of providing an analyser for analysing fluids which the analyser comprises an analyser body and a sensor part having a tight and secure connection such that fluids can be safely transferred between the analyser body and the sensor part for measuring various properties or parameters from the fluids. The connection is provided between the analyser body and the sensor part which both provide connecting surfaces that interact with each other.

The analyser according to the invention comprises an analyser body, a sensor part and a connection between the sensor part and the analyser body. The connection comprises a fluid connection and a mechanical connection which the fluid connection is provided for transferring fluid between the sensor part and the analyser body, and the mechanical connection is provided for connecting the sensor part to the analyser body.

The mechanical connection comprises a first connecting surface and a second connecting surface which the first connecting surface has a first perimeter structure and a second perimeter structure within the first perimeter structure and the second connecting surface has a third perimeter structure and a fourth perimeter structure within the third perimeter structure. The first perimeter structure forms a first mechanical connection with the third perimeter structure and the second perimeter structure forms a second mechanical connection with the fourth perimeter structure. The fluid connection between the sensor part and the analyser body is provided within the second mechanical connection.

The sensor part analyses the fluids flowing between the analyser body and the sensor part and in order to conduct proper analysis the fluid should be able to flow between the analyser body and the sensor part in such a way that there are no leaks or anything else that prevents actual results from being obtained. Therefore, the fluid connection between the sensor part and the analyser body is arranged within the second mechanical connection so that there are two mechanical connections between the analyser body and the sensor part to secure the fluid connection within the mechanical connections.

In a preferred embodiment of the invention the first and second perimeter structures in the first connecting surface and the third and fourth perimeter structures in the second connecting surface are arranged coaxially.

In an embodiment of the invention the first mechanical connection is formed as a lip and recess connection in which the lip is arranged against an inner periphery of the recess in which a spring force of the lip tensions on the inner periphery of the recess; or the first mechanical connection is formed as a lip and recess connection in which the recess is formed by a protrusion and the lip is arranged against an inner periphery of the recess in which the spring force of the lip tensions on the inner periphery of the recess; and the second mechanical connection is formed as a protrusion and recess connection in which the protrusion in arranged into the recess such that an outer surface of the recess is against an inner surface of the recess. The recess can be a cavity or a depression with respect to a surface or the like, which comprises a periphery.

In other words, the first mechanical connection is formed between the first perimeter structure and the third perimeter structure which are the outer perimeter structures of the analyser body and the sensor part. When the first mechanical connection is a lip and recess connection the outer perimeter structure of one of the sensor part and the analyser body comprises the lip and the outer perimeter structure of the other one of the sensor part and the analyser body comprises the recess. In a connection between the analyser body and the sensor part the lip is placed against the inner surface of the recess such that a tight first mechanical connection is formed. In the first mechanical connection the recess bottom surface and the surface between the lip and the inner perimeter structure are arranged against each other. In the most preferable embodiment of the invention the lip is provided in the sensor part and the recess forming the outer perimeter structure is provided in the analyser body and may extend from a wall surface of the analyser body inwards into the analyser body or inwards into the analyser wall or alternatively the recess may be formed by a protrusion protruding outwards from the wall surface and comprising a recess within the protrusion, which the recess extends from the outer surface of the protrusion inwards into the protrusion and comprises an inner periphery and a bottom surface forming the recess.

In other words, the second mechanical connection is formed between the second perimeter structure and the fourth perimeter structure which are the inner perimeter structures of the analyser body and the sensor part. When the second mechanical connection is a protrusion and recess connection the inner perimeter structure of one of the sensor part and the analyser body comprises the protrusion and the inner perimeter structure of the other one of the sensor part and the analyser body comprises the recess. In a connection between the analyser body and the sensor part the protrusion is inserted into the recess such that an outer surface of the protrusion is against the inner periphery of the recess for forming a tight second mechanical connection. In the most preferable embodiment of the invention a groove is provided in the proximity of the recess in the inner perimeter structure. A wall is formed between the groove and the recess which is flexible such that it is capable of bending toward the groove when the protrusion is inserted into the recess.

The fluid connection between the sensor part and the analyser body is formed within the second mechanical connection. The fluid connection comprises a first fluid coupling and a second fluid coupling connection together for the fluid to flow through the fluid connection. The fluid couplings can be for example medical instrumentations, luer taper or similar sliding tip connections or simple cavity for diffusion with the sensor part cavity.

In an embodiment of the invention the connection of the analyser further comprises an electrical connection for conducting electricity between the sensor part and the analyser body. The electrical connection between the sensor part and the analyser body is preferably provided between the first mechanical connection and the second mechanical connection. The electrical connection can be for example a USB connection having a USB plug and a corresponding USB port.

The connecting surfaces of the analyser body and the sensor part are preferably formed between the outer perimeter structures and the inner perimeter structure, i.e. between the first and second perimeter structure and between the third and fourth perimeter structure. In other words, the connecting surfaces of the analyser body and the sensor part that are connecting each other are formed between the first mechanical connection and the second mechanical connection. The electrical connection is provided through the connecting surfaces such that the first electrical connection is provided in the first connecting surface and the second electrical connection is provided in the second connecting surface. The second mechanical connection separates the fluid connection and the electrical connection from each other, or the second mechanical connection separates the surfaces comprising the fluid connection and the electrical connection.

In an embodiment of the invention the second connecting surface further comprises a groove in the proximity of the fourth perimeter structure, i.e. in the proximity of the inner perimeter structure, which the fourth perimeter structure is a recess such that a wall is formed between the groove and the recess and said wall is arranged to be flexible and is capable of bending toward the groove when the second perimeter structure is provided in the recess. The bendable and flexible wall provides a tight and sealed connection between the recess and the inner perimeter structure, which is either the second perimeter structure or the fourth perimeter structure and preferably a protrusion. When the protrusion is provided in the recess the wall bends and forms a seal between the protrusion and the recess.

In an embodiment of the invention the sensor part has the first connecting surface and the analyser body has the second connecting surface; or alternatively the analyser body has the first connecting surface and the sensor part has the second connecting surface.

In an embodiment of the invention the analyser further comprises a hollow collar to be provided around the mechanical connection and especially around the first mechanical connection formed from the outer perimeter structures. The collar has an axis x and comprises a first end edge to be placed against the analyser body, a second end edge and an inner surface extending between the first end edge and the second end edge. The collar further comprises an inner flange extending from the inner surface toward the axis x and forming a flange surface facing toward the first end edge. The inner flange is to be placed against a flange of the sensor part. The inner flange is preferably provided in the second end of the collar and near the second end edge or such that the flange is part of the second end edge. The collar is preferably releasably secured around the connection for example connecting the collar to the analyser body or to the sensor part or to both the analyser body and the sensor part.

The analyser body according to the invention comprises one or more walls and at least one of the one or more walls comprises a mechanical connecting surface for connecting the analyser body and a sensor part together. The mechanical connecting surface has an outer perimeter structure and an inner perimeter structure within the outer perimeter structure which the outer perimeter structure and the inner perimeter structure are arranged on the mechanical connecting surface, and a fluid coupling connectable to a corresponding fluid coupling of the sensor part for providing a fluid connection between the analyser body and the sensor part. The fluid coupling is provided within the inner perimeter structure on the mechanical connecting surface. In other words, the outer perimeter structure and the inner perimeter structure are provided on the mechanical connecting surface such that the outer perimeter structure and the inner perimeter structure form part of the mechanical connecting surface. In still other words, the outer and inner perimeter structures are part of the surface of the mechanical connecting surface. The mechanical connecting surface is provided in connection with a side wall of the analyser body and the same side wall can comprise one or more mechanical connecting surface which are arranged for connecting a sensor part to the analyser body or connecting the analyser body to the sensor part. The analyser body may comprise several mechanical connecting surfaces in one or more side walls. The mechanical connecting surface comprises in other words at least two connecting structures which form a mechanical connection with corresponding connecting structure of the sensor part. The outer perimeter structure forms an outer mechanical connection with a corresponding outer perimeter structure and the inner perimeter structure forms an inner mechanical connection with a corresponding inner perimeter structure.

In a preferable embodiment of the invention the at least one of the one or more walls further comprises an electrical coupling connectable to a corresponding electrical coupling of the sensor part for forming an electrical connection with the sensor part. The electrical coupling is provided between the outer perimeter structure and the inner perimeter structure. In other words, the electrical coupling is provided within the outer perimeter structure but outside of the inner perimeter structure. The electrical coupling is therefore in a separate area in the mechanical connecting surface of the analyser body than the fluid coupling which means that the electrical coupling and the fluid coupling are separated from each other by the inner perimeter structure which forms a mechanical connection with a corresponding inner perimeter structure of the sensor part keeping the electrical and fluid connections separated in the connected analyser.

In an embodiment of the invention the mechanical connecting surface of the analyser body comprises the outer perimeter structure which is a recess having a periphery. The recess is formed within the analyser body or within the wall of the analyser body such that the recess extends from a surface of the wall inwards into the analyser body or into the wall of the analyser. The recess comprises a bottom, i.e. an outer perimeter surface, which forms at least part of the mechanical connecting surface. Alternatively, the mechanical connecting surface of the analyser body comprises the outer perimeter structure which is a protrusion having a recess within the protrusion with a periphery. The protrusion is arranged to protrude outwards from the surface of the wall and the recess is formed within the protrusion such that the recess extends from the protrusion surface inwards into the protrusion. In other words, the protrusion may be for example a rim protruding from the wall surface and forming the recess within the rim. The bottom of the recess may be on the same level as the wall surface or on a different level than the wall surface.

In an embodiment of the invention the mechanical connecting surface of the analyser body comprises the inner perimeter structure which is a protrusion. The protrusion is arranged to protrude outwards from the outer perimeter surface and comprises a protrusion surface in the end of the protrusion. The fluid coupling is formed to extend from inside of the protrusion to the protrusion surface. Alternatively, the mechanical connecting surface of the analyser body comprises the inner perimeter structure which is a protrusion having a recess within the protrusion, the recess having a periphery. Similarly, as the outer perimeter structure, the protrusion is arranged to protrude outwards from the surface of the wall and the recess is formed within the protrusion such that the recess extends from the protrusion surface inwards into the protrusion. In other words, the protrusion may be for example a rim protruding from the wall surface and forming the recess within the rim. The bottom of the recess may be on the same level as the wall surface or on a different level than the wall surface. The bottom of the recess forming the inner perimeter surface and comprises a fluid coupling extending from the analyser body or from the analyser wall to the inner perimeter surface, i.e. to the bottom of the recess. Alternatively, the mechanical connecting surface of the analyser body comprises the inner perimeter structure which is a recess having a periphery. In a preferable embodiment of the invention the recess comprises a groove around the recess such that a wall is formed between the recess and the groove which the wall is flexible such that the wall is capable of bending toward the groove when a protrusion is inserted into the recess and the wall is resilient such that the wall provides a seal between the recess and the protrusion when the protrusion is placed in the recess. The wall between the recess and the groove forms a seal for the fluid connection formed by connecting a fluid coupling of the analyser body and a fluid coupling of the sensor part.

The sensor part according to the invention comprises a sensor casing and a sensor provided inside the sensor casing. The sensor part further comprises a mechanical connecting surface in connection with the sensor casing for forming a mechanical connection with an analyser body and a fluid coupling connectable to a corresponding fluid coupling of the analyser body for providing a fluid connection between the sensor part and the analyser body. The mechanical connecting surface of the sensor part having an outer perimeter structure and an inner perimeter structure within the outer perimeter structure which the outer perimeter structure and the inner perimeter structure are arranged on the mechanical connecting surface and the fluid coupling is provided within the inner perimeter structure on the mechanical connecting surface. Similarly, as in the analyser body the fluid coupling which forms a fluid connection with a fluid coupling of the analyser body, is arranged within the inner perimeter structure forming an inner mechanical connection, i.e. a second mechanical connection so that there are two mechanical connections between the analyser body and the sensor part to secure the fluid connection within the mechanical connections. In other words, the outer perimeter structure and the inner perimeter structure are provided on the mechanical connecting surface forming part of the surface of the mechanical connecting surface. The fluid connection is provided within the inner perimeter structure, i.e. within the second mechanical connection when the sensor part and the analyser body are connected together.

In an embodiment of the invention the sensor casing comprises at least one wall and an end surface. The at least one wall extends from the end surface and the mechanical connecting surface is provided in the end surface of the sensor casing. In a most preferable embodiment of the invention the sensor casing is a cylindrical casing having one wall. The end surface is transverse relative to the at least one wall and preferably perpendicular relative to the at least one wall.

The sensor casing further comprises a flange extending outwards from the at least one wall and forming a flange surface transverse relative to the at least one wall. The flange surface is provided at a first distance from the end surface. The flange may be formed as a rim extending from the side wall or a rim formed around the side wall or alternatively the flange may be formed to extend from the outer perimeter structure or from the end surface to the flange surface arranged at a distance from the end surface and form a flange having for example a conical shape or a cylindrical shape.

In the most preferable embodiment of the invention the sensor part is cylindrical such that the outer perimeter structure and the inner perimeter structure are coaxial. In another embodiment of the invention the sensor part is cylindrical but the outer perimeter structure and one or more inner perimeter structures are not coaxial.

In an embodiment of the invention the sensor part further comprises an electrical coupling connectable to a corresponding electrical coupling of the analyser body for forming an electrical connection with the analyser body. The electrical coupling is provided between the outer perimeter structure and the inner perimeter structure, i.e. in the outer perimeter surface.

In an embodiment of the invention the outer perimeter structure comprises or is formed as a flexible lip which is to be arranged against a periphery of a recess of the analyser body for forming tight and sealed first mechanical connection, i.e. an outer mechanical connection, with the analyser body. In a most preferable embodiment of the invention the flexible lip is arranged to protrude outwards from the wall of the sensor casing and is preferably but not necessarily integral with the end surface of the casing such that the lip forms part of the end surface of the casing. In other words, the lip is preferably parallel to the end surface of the casing, i.e. to the connecting surface. Alternatively, the lip protrudes at an angle relative to the end surface. In a preferable embodiment of the invention the lip extends outwards from the wall of the casing such that the diameter of the lip and the diameter of the flange formed in the casing are substantially the same. In a preferable embodiment of the invention the outer perimeter structure is a lip and the outer perimeter structure is uniform with the outer perimeter surface formed between the outer perimeter structure and the inner perimeter structure. This means that at least part of the lip forms part of the outer perimeter surface, i.e. a mechanical connecting surface between the outer perimeter structure and the inner perimeter structure. In an embodiment of the invention the inner perimeter structure is a recess having a periphery. The inner perimeter structure preferably comprises in the proximity of the recess a groove such that a wall is formed between the groove and the recess which the wall is flexible such that it is able to bend toward the groove when inserting a protrusion into the recess. The wall is also resilient such that when a protrusion is provided in the recess the wall forms a tight connection with the protrusion sealing the connection between the protrusion and the recess. Alternatively, the inner perimeter structure is a protrusion protruding outwards from the outer perimeter surface and forming a protrusion surface in the end of the protrusion. The protrusion comprises a fluid coupling extending from the inside of the protrusion to the protrusion surface. The protrusion of the sensor part is to be provided into a recess of the analyser body.

The connection surface of the analyser body forming the connection with the connection surface of the sensor part is provided on the outer surface of the analyser body. The outer surface of the analyser body forms the exterior of the analyser body.

An advantage of the invention is that the connection between the analyser body and the sensor part in the analyser is so secure that the analyser can be used in connection with a moving object such as a drone. Another advantage of the invention is that the fluid connection between the analyser body and the sensor part is sealed such that the fluid to be analysed is transferred between the analyser body and the sensor part in a controlled manner.

BRIEF DESCRIPTION OF THE DRAWINGS

The invention is described in detail by means of specific embodiments with reference to the enclosed drawings, in which
FIGS. 4a and 4b show an analyser body and a sensor part according to the invention;
FIGS. 5a and 5b show another embodiment of an analyser body and a sensor part according to the invention;
FIGS. 6a and 6b show another embodiment of an analyser body and a sensor part according to the invention as seen from side;
FIGS. 7a and 7b show yet another embodiment of an analyser body and a sensor part according to the invention as seen from side;
FIGS. 9a and 9b show yet another embodiment of an analyser body and a sensor part according to the invention as seen from side;
FIGS. 10a and 10b show yet another embodiment of an analyser body and a sensor part according to the invention as seen from side;
FIGS. 11a and 11b show an analyser according to the invention;
FIGS. 13a and 13b show an embodiment of an analyser body and a sensor part according to the invention.

DETAILED DESCRIPTION OF THE INVENTION

Figure 1:
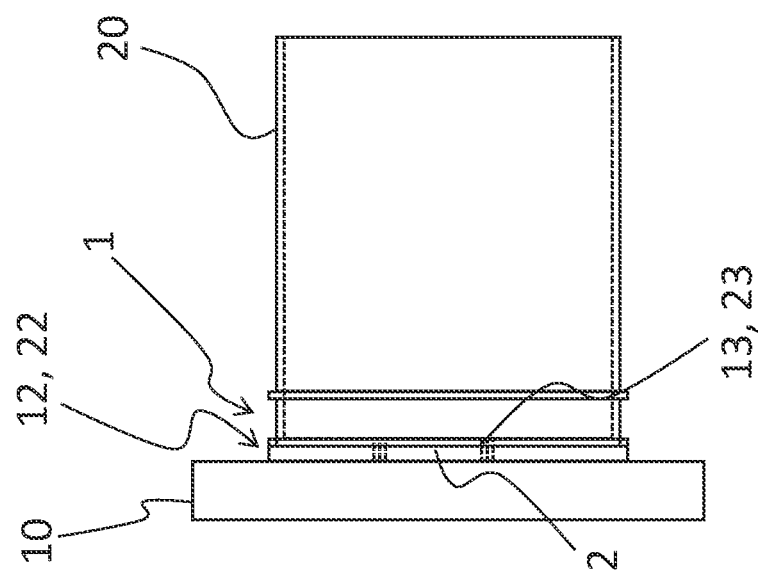
FIG. 1 shows an analyser according to the invention.

FIG. 1 shows an analyser according to the invention which comprises an analyser body 10, a sensor part 20 and a connection between the sensor part 20 and the analyser body 10. In FIG. 1 the analyser is in its assembled state, in other words, the sensor part 20 is connected to the analyser body 10. In the figures of this application the analyser body 10 is illustrated as a relatively thin structure when compared to the sensor part 20, however, this is only for the sake of simplicity in the figures and does not render or suggest that the actual analyser body 10 is limited to or will be such a thin structure. The connection between the sensor part 20 and the analyser body 10 comprises a fluid connection 2 for transferring fluid between the sensor part 20 and the analyser body 10, and a mechanical connection 1 for connecting the sensor part 20 to the analyser body 10. In other words, the mechanical connection connects the analyser body 10 and the sensor part 20 mechanically together and the fluid connection connects the analyser body 10 and the sensor part 20 such that fluid, for example gas, gas with small particles, liquid or liquid with small particles, can flow between the sensor part 20 and the analyser body 10.

The mechanical connection 1 comprises a first connecting surface 11 and a second connecting surface 21 connecting each other. The first connecting surface 11 has a first perimeter structure 12 and a second perimeter structure 13 within the first perimeter structure 12 and the second connecting surface 21 has a third perimeter structure 22 and a fourth perimeter structure 23 within the third perimeter structure 22. In other words, the first perimeter structure 12 and the third perimeter structure 22 are outer perimeter structures 12, 22 and the second perimeter structure 13 and the fourth perimeter structure 23 are inner perimeter structures 13, 23 because the second perimeter structure 13 is within the first perimeter structure 12 and the fourth perimeter structure 23 is within the third perimeter structure 22. The first perimeter structure 12 forms a first mechanical connection 1a with the third perimeter structure 22 and the second perimeter structure 13 forms a second mechanical connection 1b with the fourth perimeter structure 23. In other words, the outer perimeter structures 12, 22 form a first mechanical connection 1a and the inner perimeter structures 13, 23 form a second mechanical connection 1b. So, there are at least two mechanical connections simultaneously connecting the sensor part 20 and the analyser body 10 together. The fluid connection 2 between the sensor part 20 and the analyser body 10 is provided within the second mechanical connection 1b.

Figure 2:
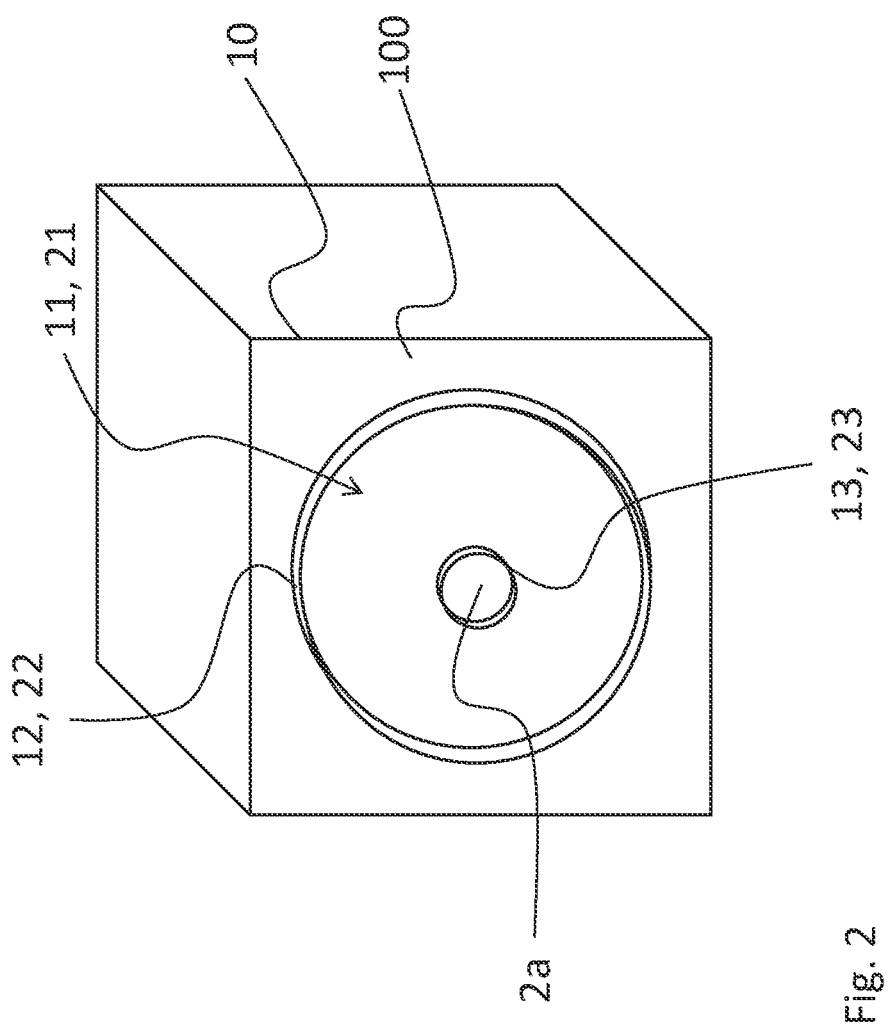
FIG. 2 shows an analyser body according to the invention.

FIG. 2 shows an analyser body according to the invention, which the analyser body 10 comprises one or more walls 100 and at least one of the one or more walls 100 comprises a mechanical connecting surface 11, 21 for connecting the analyser body 10 and a sensor part 20 together, and a fluid coupling 2a connectable to a corresponding fluid coupling 2b of the sensor part 20 for providing a fluid connection 2 between the analyser body 10 and the sensor part 20. The mechanical connecting surface 11, 21 of the analyser body 10 has an outer perimeter structure 12, 22 and an inner perimeter structure 13, 23 within the outer perimeter structure 12, 22 for forming a connection with a corresponding outer perimeter structure and an inner perimeter structure of a sensor part. The outer perimeter structure 12, 22 is arranged to form a first mechanical connection 1a with a corresponding outer perimeter structure 12, 22 of the sensor part 20 and the inner perimeter structure 13, 23 is arranged to form a second mechanical connection 1b with a corresponding inner perimeter structure 13, 23 of the sensor part 20. The fluid coupling 2a is provided within the inner perimeter structure 13, 23. The fluid coupling 2a is any kind of fluid coupling suitable for connecting a corresponding fluid coupling 2b of the sensor part 20 and capable for transferring fluid between the analyser body 10 and the sensor part 20.

Figure 3:
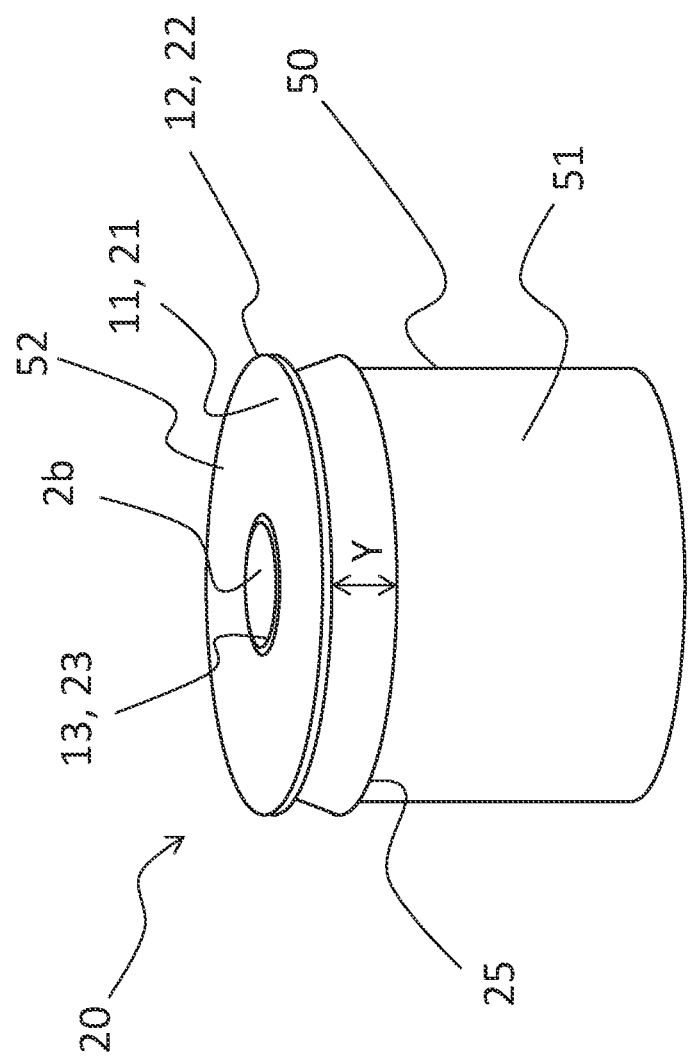
FIG. 3 shows a sensor part according to the invention.

FIG. 3 shows a sensor part according to the invention which the sensor part 20 comprises a sensor casing 50 and a sensor provided inside the sensor casing 50. The sensor part 20 further comprises a mechanical connecting surface 11, 21 in connection with the sensor casing 50 for forming a mechanical connection with an analyser body 10. The mechanical connecting surface 11, 21 of the sensor part 20 has an outer perimeter structure 12, 22 and an inner perimeter structure 13, 23 within the outer perimeter structure 12, 22 for forming a connection with a corresponding outer perimeter structure and an inner perimeter structure of an analyser body 10 as shown in FIG. 2 in which the analyser body 10 comprises a corresponding mechanical connecting surface 11, 21 for forming the mechanical connection with the sensor part 20. The mechanical connecting surface 11, 21 has an outer perimeter structure 12, 22 and an inner perimeter structure 13, 23 within the outer perimeter structure 12, 22. The outer perimeter structure 12, 22 is arranged to form a first mechanical connection 1a with a corresponding outer perimeter structure 12, 22 of the analyser body 10 and the inner perimeter structure 13, 23 is arranged to form a second mechanical connection 1b with a corresponding inner perimeter structure 13, 23 of the analyser body 10. The mechanical connecting surface 11, 21 further comprises a fluid coupling 2b connectable to a corresponding fluid coupling 2a of the analyser body for providing a fluid connection 2 between the sensor part 10 and the analyser body 20. The fluid coupling 2b is provided within the inner perimeter structure 13, 23.

FIG. 3 also shows that the sensor casing 50 comprises at least one wall 51 and an end surface 52 which the at least one wall 51 is extending from the end surface 52. In the embodiment shown in FIG. 3 the sensor casing 50 is a cylindrical part having only one wall 51 and the end surface 52 is arranged transverse to the wall 51. The mechanical connecting surface 11, 21 is provided in the end surface 52 of the sensor casing 50. In other words, when the sensor part 20 is connected to the analyser body 10 through the mechanical connecting surface 11, 21 the rest of the sensor casing 50 comprising the wall 51 is arranged to protrude outwards from the analyser body 10. The sensor casing 50 further comprises a flange 25 extending outwards from the at least one wall 51. The flange 25 forms a flange surface 25a transverse relative to the at least one wall 51. The flange surface 25a is shown better in FIGS. 6b, 7b, 9b and 10b. The flange surface 25a is provided at a first distance Y from the end surface 52 and faces away from the end surface 52. In the embodiment of FIG. 3 the flange 25 is formed as a conical part extending from the outer perimeter structure 12, 22 to the flange surface 25a but the flange 25 may also be formed from the side wall 51 as flange protrusion extending outwards from the side wall 51 such that the casing 50 between the outer perimeter structure 12, 22 and the flange 25 is cylindrical or similar as the rest of the casing wall 51.

FIGS. 4a and 4b show an analyser body and a sensor part according to the invention. In this embodiment of the invention the first connecting surface is provided in the analyser body 10 and the second connecting surface 21 is provided in the sensor part 20. FIG. 4a shows that the analyser body 10 comprises a first perimeter structure 12 and the second perimeter structure 13 within the first perimeter structure 12 and the first fluid coupling 2a provided within the second perimeter structure 13. In this embodiment of the invention the first fluid coupling 2a comprises an opening within the second perimeter structure 13 in a second perimeter surface 13a. The second perimeter surface is an inner perimeter surface. FIG. 4b shows the sensor part 20 having a third perimeter structure 22 and a fourth perimeter structure 23 within the third perimeter structure 22. A third perimeter surface 22a is formed between the third perimeter structure 22 and the fourth perimeter structure 23. The third perimeter surface is an outer perimeter surface. A second fluid coupling 2b is formed within the fourth perimeter structure 23. In this embodiment of the invention the sensor part 20 comprises a recess forming the fourth perimeter structure 23, i.e. the fluid coupling 2b is provided in the recess. In other words, the periphery of the recess is the fourth perimeter structure 23. The second connecting surface 21 further comprises a groove 24 in the proximity of the fourth perimeter structure 23, i.e. in the proximity of the recess, such that a wall 24a is formed between the groove 24 and the recess and the wall 24a is capable of bending toward the groove 24 when the second perimeter structure 13 of the analyser body 10 is provided in the recess. In other words, as the second mechanical connection 1b is formed between the analyser body 10 and the sensor part 20 the wall 24a between the recess and the grove 24 bends toward the third perimeter structure 22 thereby allowing the second mechanical connection 1b between the analyser body 10 and the sensor part 20 to be tight. The material of the wall 24a between the recess and the groove 24 is such that it is flexible and bendable but provides a sealing in the fluid connection between the fluid couplings 2a, 2b of the sensor part 20 and the analyser body 10.

FIGS. 5a and 5b show another embodiment of an analyser body and a sensor part according to the invention in which the analyser body 10 is provided with a first electrical coupling 3a and the sensor part 20 is provided with a second electrical coupling 3b. FIG. 5a shows that the at least one of the one or more walls 100 of the analyser body 10 comprises an electrical coupling 3a connectable to a corresponding electrical coupling 3b of the sensor part 20 for forming an electrical connection 3 with the sensor part 20. The electrical coupling 3a is provided between the outer perimeter structure 12, 22 and the inner perimeter structure 13, 23, i.e. in a first perimeter surface 12a. The first perimeter surface is an outer perimeter surface. The electrical coupling 3a can be for example a USB connection. The second perimeter surface 13a comprises in this embodiment of the invention the fluid couplings 2a provided within the second perimeter structure 13. FIG. 5b shows that the sensor part 20 further comprises an electrical coupling 3b connectable to a corresponding electrical coupling 3a of the analyser body 10 for forming an electrical connection 3 with the analyser body 10. The electrical coupling 3b of the sensor part 20 is provided between the outer perimeter structure and the inner perimeter structure, i.e. between the third perimeter structure 22 and the fourth perimeter structure 23, i.e. in the third perimeter surface 22a. The fluid coupling 2b is in the embodiment of the invention shown in FIG. 5b a recess in which a fluid coupling insert may be inserted or the fluid coupling 2b may in other way be formed in the recess.

FIGS. 6a and 6b show another embodiment of an analyser body and a sensor part according to the invention as seen from side in which the analyser body 10 comprises the first connecting surface 11 with the first perimeter structure 12, the second perimeter structure 13 and a first fluid coupling 2a and the sensor part 20 comprises the second connecting surface 21 with the third perimeter structure 22, the fourth perimeter structure 23 and a second fluid coupling 2b. FIG. 6a shows the analyser body 10 having the outer perimeter structure 12, i.e. the first perimeter structure 12, being a recess having a periphery, the recess extending from the wall surface 100a inwards into the analyser body or into the wall 100 of the analyser body 10. The bottom of the recess forms the first perimeter surface 12a. The inner perimeter structure of the analyser body 10 in this embodiment of the invention, i.e. the second perimeter structure 13, is a protrusion protruding from the first perimeter surface 12a outwards toward a wall surface 100a of the analyser body 10 or to the wall surface 100a or outside of the wall surface 100a. The protrusion provides the second perimeter structure 13 and forms the second perimeter surface 13a within the second perimeter structure 13 which also comprises the first fluid coupling 2a. The protrusion comprises a recess such that the protrusion forms a peripheral wall around the recess and the bottom of the recess forms the second perimeter surface 13a. The first perimeter surface 12a and the second perimeter surface 13a may be arranged on the same or different plane. The first perimeter surface 12a forms the first connecting surface 11 which connects with the second connecting surface 21 which is formed from the third perimeter surface 21a. FIG. 6b shows the sensor part 20 having the outer perimeter structure 22, i.e. the third perimeter structure 22, being a lip extending outwards from the casing wall 51. The lip is formed as a flexible lip such that when inserted into a recess in the analyser body 10, i.e. into the outer perimeter structure 12 of the analyser body 10, i.e. into the first perimeter structure 12 of the analyser body, the lip forms together with the periphery of the recess a tight mechanical connection, i.e. a lip and recess connection, which is tight joint. The flexibility of the lip is flexible to the extent that a tight connection between the sensor part and the analyser body may be formed which is a secure connection but still releasable. The inner perimeter structure 23, i.e. the fourth perimeter structure 23, is a recess having a periphery. The sensor part 20 comprises a groove in the proximity of the recess such that the wall between the groove and the recess is formed. The wall is flexible in such a way that when the protrusion of the analyser body 10 is inserted into the recess the wall bends away from the recess and forms a seal between the protrusion and the recess, i.e. seals the second mechanical connection. The second mechanical connection 1b in this embodiment of the invention is therefore a protrusion and recess connection.

FIG. 6b also shows that a flange 25 is formed in the sensor part 20. The flange 25 in this embodiment of the invention is a conical flange extending from the outer perimeter structure 22, i.e. from the third perimeter structure 22, toward the flange surface 25a. The flange surface 25a is facing away from the second connecting surface 21 and is parallel to the second connecting surface 21. The flange surface 25a is provided at a first distance Y from the end surface 52, i.e. from the second connecting surface 21.

FIGS. 7a and 7b show yet another embodiment of an analyser body and a sensor part according to the invention as seen from side in which the analyser body 10 comprises the first connecting surface 11 with the first perimeter structure 12, the second perimeter structure 13 and a first fluid coupling 2a and the sensor part 20 comprises the second connecting surface 21 with the third perimeter structure 22, the fourth perimeter structure 23 and a second fluid coupling 2b. 7a shows the analyser body 10 having the outer perimeter structure 12, i.e. the first perimeter structure 12, being a protrusion having a recess within the protrusion. The bottom of the recess within the protrusion forms the first perimeter surface 12a. The inner perimeter structure of the analyser body 10 in this embodiment of the invention, i.e. the second perimeter structure 13, is also a protrusion protruding from the first perimeter surface 12a outwards. The protrusion may comprise a recess within the protrusion as described in connection with FIG. 6a but not necessarily. The protrusion of the first perimeter structure 12 protrudes from the wall surface 100a of the analyser body 10 or the protrusion of the first perimeter structure 12 and the protrusion of the second perimeter structure 13 protrude both from the wall surface 100a of the analyser body 10 meaning that the first perimeter surface 12a is the wall surface 100a, i.e. the bottom of the recess within the protrusion of the first perimeter structure 12 is the wall surface 100a. The first fluid coupling 2a is provided within the second perimeter structure 13. The first perimeter surface 12a forms the first connecting surface 11 which connects with the second connecting surface 21 which is formed from the third perimeter surface 22a, i.e. the surface between the third perimeter structure 22 and the fourth perimeter structure 23. FIG. 7b shows the sensor part 20 having the outer perimeter structure 22, i.e. the third perimeter structure 22, being a lip extending outwards from the casing wall 51 similarly as described in connection with FIG. 6b. The lip is formed as a flexible lip such that when inserted into a recess formed within the protrusion in the analyser body 10, i.e. into the outer perimeter structure 12 of the analyser body 10, i.e. into the first perimeter structure 12 of the analyser body, the lip forms together with the periphery of the recess a tight mechanical connection, i.e. a lip and recess connection. The inner perimeter structure 23, i.e. the fourth perimeter structure 23, is a recess having a periphery similarly as described in connection with FIG. 6b. The sensor part 20 comprises a groove in the proximity of the recess such that the wall between the groove and the recess is formed. The second mechanical connection 1b in this embodiment of the invention is therefore a protrusion and recess connection similarly as in FIGS. 6a and 6b.

FIG. 7b also shows that the flange 25 is formed in the sensor part 20. The flange 25 in this embodiment of the invention is extending outwards from the casing wall 51 and the area between the end surface 52 of the casing and the flange 25 is cylindrical. The flange 25 comprises a flange surface 25a which is provided at a first distance Y from the end surface 52, i.e. from the second connecting surface 21 and facing away from the end surface 52.

Figure 8B:
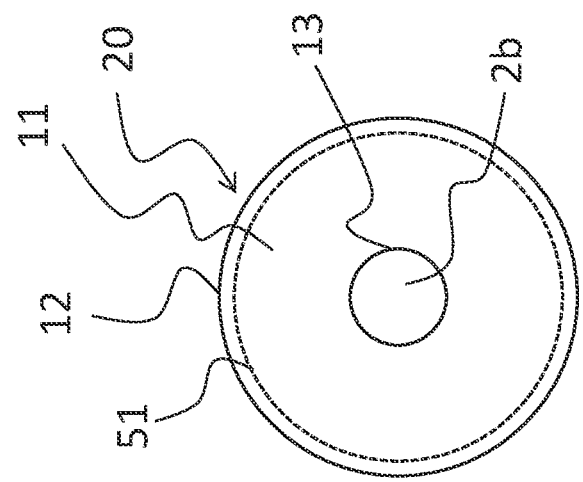
FIGS. 8a and 8b show yet another embodiment of an analyser body and a sensor part according to the invention.
Figure 8A:
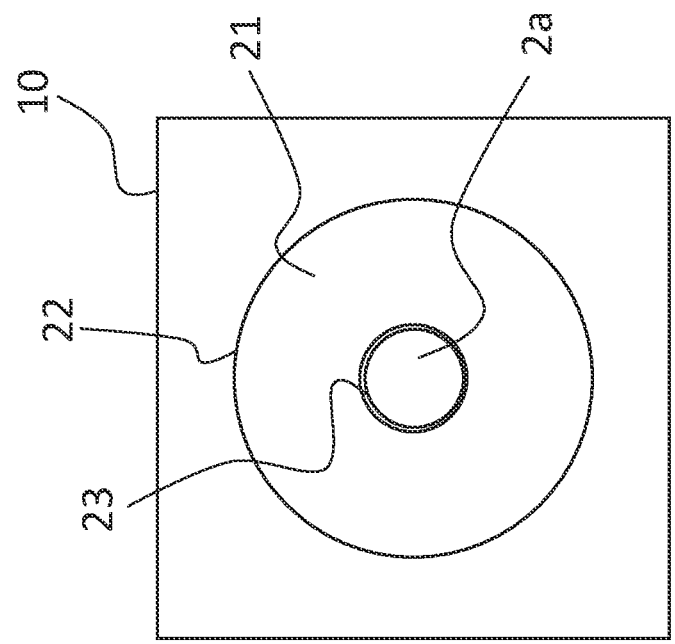

FIGS. 8a and 8b show yet another embodiment of an analyser body and a sensor part according to the invention as seen from side. In this embodiment of the invention the first connecting surface is provided in the sensor part 20 and the second connecting surface 21 is provided in the analyser body 10. FIG. 8a shows that the analyser body 10 comprises the third perimeter structure 22 and the fourth perimeter structure 23 within the third perimeter structure 22 and the first fluid coupling 2a is provided within the fourth perimeter structure 23. The third perimeter surface 22a is formed between the third perimeter structure 22 and the fourth perimeter structure 23. FIG. 8b shows the sensor part 20 having the first perimeter structure 12 and the second perimeter structure 13 within the first perimeter structure 12. A second fluid coupling 2b is formed within the second perimeter structure 23. In this embodiment of the invention the analyser body 10 comprises a recess forming the fourth perimeter structure 23, i.e. the fluid coupling 2a is provided in the recess. In other words, the periphery of the recess is the fourth perimeter structure 23. The second connecting surface 21 further comprises a groove 24 in the proximity of the fourth perimeter structure 23, i.e. in the proximity of the recess, such that a wall 24a is formed between the groove 24 and the recess and the wall 24a is capable of bending toward the groove 24 when the second perimeter structure 13 of the sensor part 20 is provided in the recess. When the analyser body 10 and the sensor part 20 are connected together the first mechanical connection is formed between the third perimeter structure 22 of the analyser body and the first perimeter structure 12 of the sensor part 20, and the second mechanical connection is formed between the fourth perimeter structure 23 of the analyser body 10 and the second perimeter structure 13 of the sensor part 20. The second mechanical connection 1b is formed between a recess in the analyser body 10 and a protrusion in the sensor part 20 and the grove 24 in the proximity of the recess in the analyser body 10 bends toward the third perimeter structure 22 thereby allowing the second mechanical connection 1b between the analyser body 10 and the sensor part 20 to be tight. The connecting surface 21 of the analyser body 10 is formed from the third perimeter surface 22a and the connecting surface 11 of the sensor part 20 is formed from the first perimeter surface 12a such that the first perimeter surface 12a and the third perimeter surface 22a contact each other when the second perimeter structure 13 which is a protrusion is inserted into the fourth perimeter structure in the analyser body 10 which is a recess forming the second mechanical connection 1b.

FIGS. 9a and 9b show yet another embodiment of an analyser body and a sensor part according to the invention as seen from side. In this embodiment of the invention the analyser body 10 comprises a protrusion as the third perimeter structure 22, i.e. the outer perimeter structure, protruding outwards from the wall surface 100a of the analyser body 10 as shown in FIG. 9a. The protrusion having a recess within the protrusion such that the bottom of the recess forms the third perimeter surface 22a which is arranged to contact with the first perimeter surface 12a of the sensor part 20. In other words, the third perimeter surface 22a being the second contacting surface 21 and the first perimeter surface 12a being the first contacting surface 11. The fourth perimeter structure 23 is a recess extending from the third perimeter surface 22a inwards into the wall 100 or into the analyser body 10. A groove 24 is provided in the proximity of the recess similarly as described in connection with FIGS. 6b and 7b. FIG. 9b shows the sensor part 20 having the first perimeter structure 12, i.e. the outer perimeter structure, and the second perimeter structure 13, i.e. the inner perimeter structure. The outer perimeter structure is a lip as described in connection with FIGS. 6b and 7b. The lip extends outwards from the casing wall 51 and is formed as a flexible lip such that when inserted into a recess in the analyser body 10, i.e. into the outer perimeter structure of the analyser body 10, the lip forms together with the periphery of the recess the first mechanical connection which is a lip and recess connection. The inner perimeter structure 13, i.e. the second perimeter structure 12, is formed as a protrusion protruding outwards from the first connecting surface 11, i.e. from the first perimeter surface 12a. The protrusion of the sensor part 20 comprises a fluid coupling 2b within the inner perimeter structure 13. When the inner perimeter structure, the second perimeter structure 13, of the sensor part 20 is connected with the inner perimeter structure, the fourth perimeter structure 23, of the analyser body 10, i.e. the protrusion of the sensor part 20 is inserted into the recess of the analyser body 10, the second mechanical connection 1b is formed. The protrusion of the sensor part 20 bends the flexible wall provided between the groove 24 and the recess in the analyser body 10 such that a tight and sealed fluid connection is formed between the fluid couplings 2a, 2b.

FIGS. 10a and 10b show yet another embodiment of an analyser body and a sensor part according to the invention as seen from side in which the first connecting surface is provided in the sensor part 20 and the second connecting surface 21 is provided in the analyser body 10. FIG. 10a shows that the analyser body 10 comprises a third perimeter structure 22 provided as a recess having a periphery and a fourth perimeter structure 23 within the third perimeter structure 22, the fourth perimeter structure 23 is provided as a recess having a periphery. In this embodiment of the invention the third perimeter surface 22a forms the second connecting surface 21 contacting the first perimeter surface 12a of the sensor part 20 which is the first connecting surface 11. The third perimeter structure 22 is formed as a recess extending from the wall surface 100a inwards into the wall 100 of the analyser body 10 or into the analyser body 10. The fourth perimeter structure 23 is formed also as a recess extending from the first perimeter surface 12a inwards into the wall 100 of the analyser body 10 or into the analyser body 10. The groove 24 is provided in connection with the fourth perimeter structure 23 similarly as described in connection with FIG. 9a. The fluid coupling 2a of the analyser body 10 forming the fluid connection with the fluid coupling 2b of the sensor part 20 is provided within the fourth perimeter structure 23. FIG. 10b shows the sensor part 20 having the first perimeter structure 12 which is a lip as already described in connection with previous figures. The second perimeter structure 13 is a protrusion protruding outwards from the first perimeter surface 12a. The second perimeter structure 13 is provided with a fluid coupling 2b.

FIGS. 11a and 11b show an analyser according to the invention in which the FIG. 11a shows the analyser body 10, the sensor part 20 and a connection which connects the sensor part 20 to the analyser body 10 and FIG. 11b shows a collar to be arranged in the connection. The analyser in other words further comprises a hollow collar 30 shown in FIG. 12b to be provided around the mechanical connection 1 between the analyser body 10 and the sensor part 20. The collar 30 has an axis x and comprises a first end edge 31 to be placed against the analyser body 10, a second end edge 32 and an inner surface extending between the first end edge 31 and the second end edge 32. The collar 30 further comprises an inner flange 33 extending from the inner surface toward the axis x and forms a flange surface 33a facing toward the first end edge 31. The inner flange 33 of the collar 30 is to be placed against a flange 25 of the sensor part 10. The hollow collar 30 can be secured against the wall 51 of the sensor part 20 in the area between the end surface 52 and the flange surface 25 for example with screws or by other connecting means or the collar 30 can be connected to the analyser body 20 with connecting means arranged between the collar 30 and the analyser body 20. An example of a connection between the collar 30 and the analyser body 10 is a peg protruding from the collar 30 and a stopping member provided in connection with the wall of the analyser body which operate together such that when the collar 30 is provided around the connection 1 the collar 30 is turned around the axis such that the peg contacts the stopping member and forms a connection with the stopping member such that the collar cannot be detached without turning the collar back into the position in which it was arranged around the connection 1.

Figure 12:
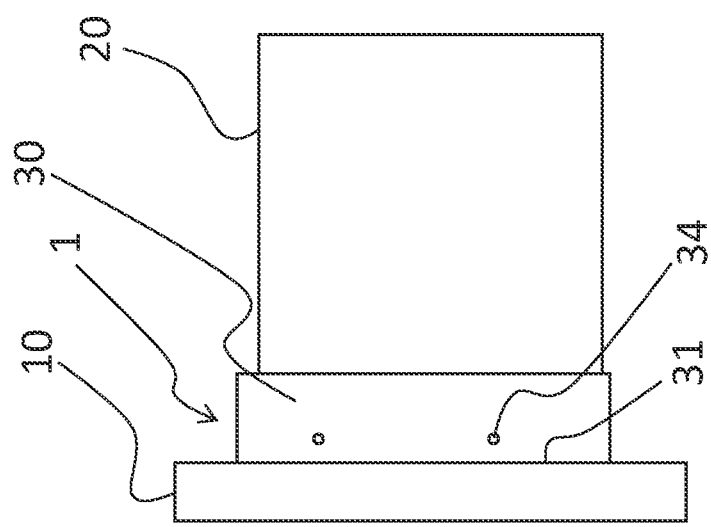
FIG. 12 shows an embodiment of an analyser according to the invention.

FIG. 12 show an embodiment of an analyser according to the invention in which the sensor part 20 is connected to the analyser body 10 through the mechanical connection 1 and the hollow collar 30 is provided around the mechanical connection 1 such that the first end edge 31 of the collar 30 is provided against the analyser body 10. In this embodiment of the invention the collar 30 comprises holes 34 for the connecting means securing the connection between the collar 30 and the mechanical connection 1.

FIGS. 13a and 13b show yet another embodiment of an analyser body and a sensor part forming an analyser according to the invention. In this embodiment the first connecting surface is provided in the analyser body 10 and the second connecting surface 21 is provided in the sensor part 20 but the connecting surface 11, 21 can be provided also the other way round. The analyser body 10 comprises a first perimeter structure 12 and the second perimeter structure 13 within the first perimeter structure 12. In the embodiment shown in FIG. 13a the first perimeter structure 12 comprises multiple second perimeter structures 13 within the first perimeter structure 12 and especially in this embodiment of the invention the first perimeter surface 11 comprises three second perimeter structures 13 within the first perimeter structure 12. The first fluid couplings 2a are provided within the second perimeter structures 12. FIG. 13a shows that some of the second perimeter structures 12 comprise only one first fluid coupling 2a and some of the second perimeter structures 12 comprise multiple first fluid couplings 2a, and especially two first fluid couplings 2a. The first fluid couplings 2a may comprise an opening within the second perimeter structure 13 which the opening is provided with a fluid coupling part such as a medical instrument or other equivalent or suitable part. The second perimeter structure 13 borders a second perimeter surface 13a provided within the second perimeter structure 13. The second perimeter surface 13a is an inner perimeter surface in the first connecting surface 11. The first perimeter structure 12 borders a first perimeter surface 12a which is an outer perimeter surface.

FIG. 13a shows that the analyser body 10 further comprises an electrical coupling 3a connectable to a corresponding electrical coupling 3b of the sensor part 20 for forming an electrical connection 3 with the sensor part 20. The electrical coupling 3a is provided between the outer perimeter structure 12 and the inner perimeter structure 13, i.e. between the first perimeter structure 12 and the second perimeter structure 13 in the first perimeter surface 12a. The electrical coupling 3a can be for example a USB connection.

FIG. 13b show the sensor part 20 further comprises an electrical coupling 3b connectable to a corresponding electrical coupling 3a of the analyser body 10 for forming an electrical connection 3 with the analyser body 10. The electrical coupling 3b of the sensor part 20 is provided between the outer perimeter structure and the inner perimeter structure, i.e. between the third perimeter structure 22 and the fourth perimeter structure 23, i.e. in the third perimeter surface 22a. The second connecting surface 21 comprises in this embodiment of the invention three fourth perimeter structures 23 within the third perimeter structure 22. The invention is not limited to three fourth perimeter structures 22 as well as not to three second perimeter structures 12 but the first and second connecting surfaces 11, 21 may comprise one or more second and fourth perimeter structures 13, 23 in the connecting surface 11, 21. The fourth perimeter structures 22 shown in FIG. 13b comprise a groove 24 around the fourth perimeter structure 23 provided in a form of a recess and a wall 24a formed between the recess and the groove 24. The fluid couplings 2b are provided within the fourth perimeter structures 23. In the embodiments shown in FIGS. 13a and 13b the electrical couplings 3a, 3b are provided in the centre of the connecting surfaces 11, 21, however the electrical couplings 3a, 3b can be provided anywhere within the first and third perimeter structures 12, 22, in other words anywhere within the outer perimeter structures and there can be multiple electrical couplings 3a, 3b forming electrical connections together.

FIGS. 13a and 13b show that the analyser body 10 is provided with a first electrical coupling 3a and the sensor part 20 is provided with a second electrical coupling 3b. The FIGS. 13a and 13b show the analyser body 10 and the sensor part 20 which form together a mechanical connection 1 for connecting the sensor part 20 to the analyser body 10. The mechanical connection comprises a first connecting surface 11 having a first perimeter structure 12 and a second perimeter structure 13 within the first perimeter structure 12 and a second connecting surface 21 having a third perimeter structure 22 and a fourth perimeter structure 23 within the third perimeter structure 22 and the first perimeter structure 12 forming a first mechanical connection 1a with the third perimeter structure 22 and the second perimeter structure 13 forming a second mechanical connection 1b with the fourth perimeter structure 23 and the fluid connection 2 between the sensor part 20 and the analyser body 10 is provided within the second mechanical connection 1b. As the FIGS. 13a and 13b show the connection between the analyser body 10 and the sensor part 20 comprise a first mechanical connection having multiple second mechanical connections within the first mechanical connection.

Even though not illustrated in each figure the analyser further comprises an electrical connection between the sensor part 20 and the analyser body 10. The electrical connection is provided in the first connecting surface 11 in an area within the first perimeter structure 12 and the second perimeter structure 13, i.e. in the first perimeter surface 12a contacting the second connecting surface 21 in an area within the third perimeter structure 22 and the fourth perimeter structure 23, i.e. in the third perimeter surface 22a.

The invention has been described above with reference to the examples shown in the figures. However, the invention is in no way restricted to the above examples but may vary within the scope of the claims.

The invention claimed is:

1. An analyser for analysing fluids, wherein the analyser comprises an analyser body, a sensor part and a connection between the sensor part and the analyser body, the connection comprises:
  a) a fluid connection for transferring fluid between the sensor part and the analyser body, wherein the fluid connection is formed between a fluid coupling of the analyser body and a fluid coupling of the sensor part, and
  b) a mechanical connection for connecting the sensor part to the analyser body, the mechanical connection comprises:
    a first connecting surface of the analyser body having a first, outer perimeter structure and a second, inner perimeter structure, the second inner, perimeter structure arranged within the first, outer perimeter structure, the first, outer perimeter structure forming a circle; and
    a second connecting surface of the sensor part having a third, outer perimeter structure and a fourth, inner perimeter structure, the fourth, inner perimeter structure arranged within the third, outer perimeter structure, the third, outer perimeter structure forming a circle; and
    the first, outer perimeter structure forming a first mechanical connection with the third, outer perimeter structure, and the second, inner perimeter structure forming a second mechanical connection with the fourth, inner perimeter structure;

the first mechanical connection includes a lip and recess connection in which one of the first, outer perimeter structure or the third, outer perimeter structure includes a lip, and the other of the first, outer perimeter structure or the third, outer perimeter structure includes a first recess, such that in a connection between the analyser body and the sensor part, the lip is positioned in contact with an inner periphery of the first recess such that a spring force of the lip applies tension to the inner periphery of the first recess, the lip is formed as a flexible lip such that the lip and the inner periphery of the first recess form a releasable mechanical connection; and the second mechanical connection includes a protrusion and recess connection in which one of the second, inner perimeter structure or the fourth, inner perimeter structure includes a protrusion, and the other of the second, inner perimeter structure or the fourth, inner perimeter structure includes a second recess, such that in a connection between the analyser body and the sensor part, the protrusion is positioned at least partially within the second recess such that an outer surface of the protrusion is positioned in contact with an inner surface of the second recess, the second recess having a flexible wall which forms a seal between the protrusion and the second recess when the protrusion is inserted into the second recess and the flexible wall bends away from the second recess, the fluid connection between the sensor part and the analyser body is provided within the second mechanical connection, and the first mechanical connection and the second mechanical connection connect the analyser body and the sensor part together.

2. The analyser according to claim 1, wherein the first, outer perimeter structure and the second, inner perimeter structure are arranged coaxially.

3. The analyser according to claim 2, wherein the third, outer perimeter structure and the fourth, inner perimeter structure are arranged coaxially.

4. The analyser according to claim 1, wherein the connection between the sensor part and the analyser body further comprises:

c) an electrical connection for conducting electricity between the sensor part and the analyser body, the electrical connection between the sensor part and the analyser body is provided between the first mechanical connection and the second mechanical connection.

5. The analyser according to claim 4, wherein the electrical connection between the sensor part and the analyser body is provided radially inward of the first mechanical connection.

6. The analyser according to claim 5, wherein the electrical connection between the sensor part and the analyser body is provided radially outward of the second mechanical connection.

7. The analyser according to claim 1, wherein the second connecting surface further comprises:

a groove in proximity of the fourth, inner perimeter structure such that a wall is formed between the groove and the second recess, the wall is arranged to be flexible and is configured to bend toward the groove when the protrusion is positioned at least partially within the second recess.

8. The analyser according to claim 1, wherein the analyser further comprising a hollow collar to be provided around the mechanical connection, the collar having an axis (x) and comprising a first end edge to be placed against the analyser body, a second end edge, and an inner surface extending between the first end edge and the second end edge, the collar further comprising an inner flange extending from the inner surface toward the axis (x) and forming a flange surface facing toward the first end edge, the inner flange is configured for positioning against a flange of the sensor part.

9. The analyser according to claim 8, wherein the sensor part includes a conical flange configured for positioning against the inner flange of the collar.

10. The analyser according to claim 1, wherein the first, outer perimeter structure of the first connecting surface of the analyser body and the second, inner perimeter structure of the first connecting surface of the analyser body define concentric circles.

11. The analyser according to claim 1, wherein the fluid connection between the sensor part and the analyser body is offset from a radial center of the second mechanical connection.

12. The analyser according to claim 1, wherein a bottom surface of the first recess and a surface between the lip and the second, inner perimeter structure or the fourth, inner perimeter structure are arranged against each other in a connection between the analyser body and the sensor part.

13. The analyser according to claim 1, wherein the mechanical connection between the sensor part and the analyser body is a screwless connection.

14. The analyser according to claim 1, wherein the mechanical connection between the sensor part and the analyser body consists of the first mechanical connection and the second mechanical connection.

* * * * *